Figure 1:
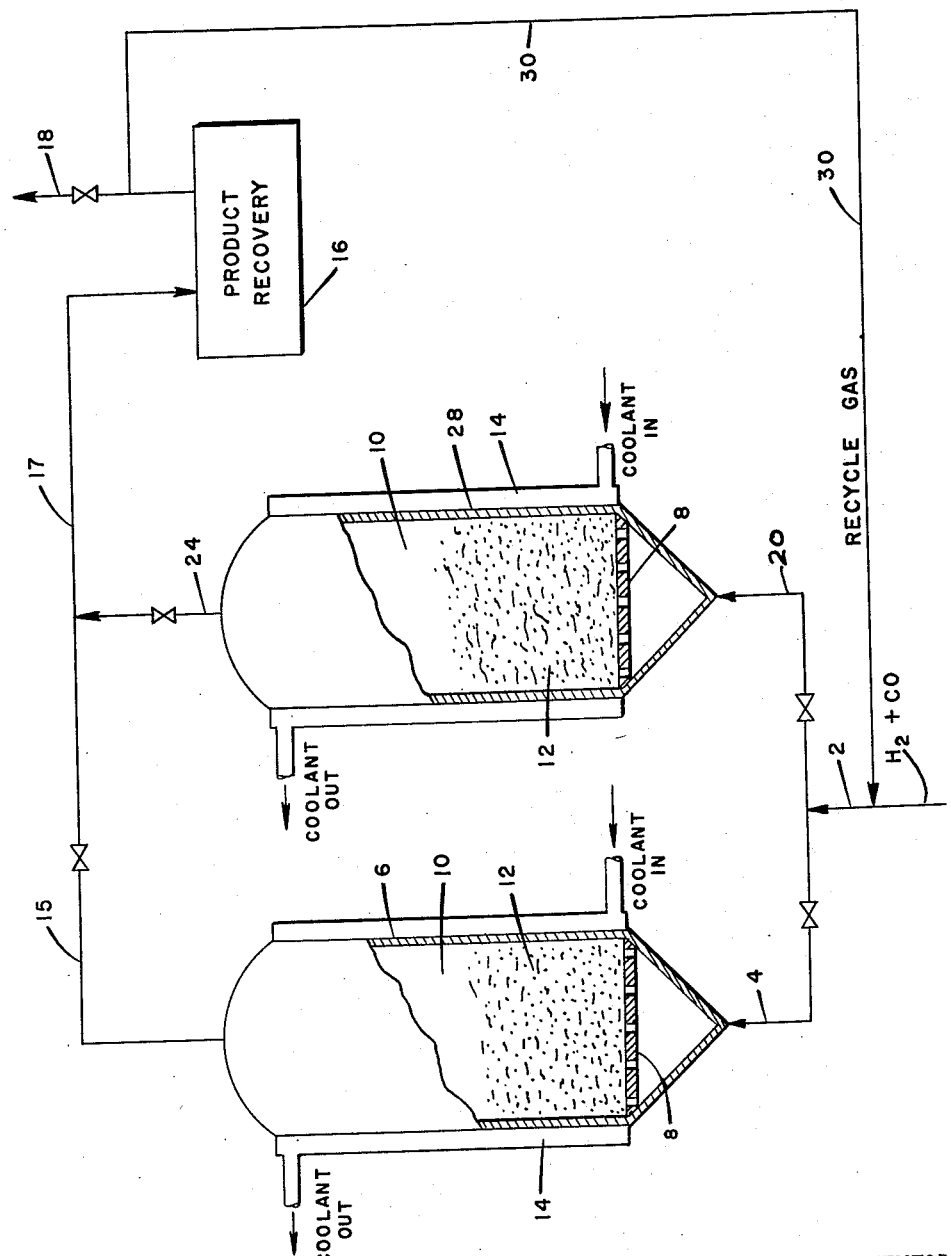

Feb. 11, 1958 R. MUNGEN 2,823,219
PROCESS FOR CONDUCTING FLUIDIZED REACTIONS
Filed May 31, 1955 2 Sheets-Sheet 1

INVENTOR.
RICHARD MUNGEN
BY *Arthur McIlroy*
ATTORNEY

Feb. 11, 1958   R. MUNGEN   2,823,219
PROCESS FOR CONDUCTING FLUIDIZED REACTIONS
Filed May 31, 1955   2 Sheets-Sheet 2

INVENTOR.
RICHARD MUNGEN
BY
ATTORNEY

United States Patent Office 2,823,219
Patented Feb. 11, 1958

2,823,219

PROCESS FOR CONDUCTING FLUIDIZED REACTIONS

Richard Mungen, Tulsa, Okla., assignor to Pan American Petroleum Corporation, a corporation of Delaware Application May 31, 1955, Serial No. 512,253

7 Claims. (Cl. 260—449.6)

The present invention relates to a novel method for the conversion of gaseous or vaporous reactants within a fluidized system. More particularly, it is concerned with a novel method for creating improved conditions for effecting more efficient contacting between gaseous or vaporous reactants and finely divided fluidized solids. While the process of my invention has a wide variety of applications, insofar as fluidized methods are concerned, I have found it to be particularly applicable to the synthesis of hydrocarbons from carbon monoxide and hydrogen in the presence of a fluidized catalyst.

It has been observed that, although it is relatively easy to achieve good conversion of carbon monoxide to useful products when reacted with hydrogen under synthesis conditions in a reactor of small diameter, e. g., 2 inches, the conversion drops off very rapidly as the diameter of the reactor is increased. Thus, for example, in a pilot plant reactor 2 inches in diameter and approximately 20 feet in length, total feed carbon monoxide conversions of from 85 to 90 percent are secured, while with a reactor designed for commercial operations, i. e., 16 feet in diameter by 20 feet in length, the total feed carbon monoxide conversion is found to decrease to about 45 to 55 percent.

From my observations, I believe that the principal factor in this sharp difference in operating efficiency, as the diameter of the reactor increases, is the failure to achieve adequate gas-solids contacting under such conditions. This undesirable condition in reactors of larger diameter I believe to be due to the formation of large gas bubbles in the bed of fluidized catalyst, thereby creating a relatively small catalyst surface to gas volume ratio which means that the gaseous reactants are able to contact only a comparatively small portion of the total catalyst present in the reactor. Also, channeling of the gas through unfluidized portions of the catalyst bed tends to occur which diminishes further the possibility of favorable gas-solids contact during synthesis.

Accordingly, it is an object of my invention to provide a method capable of promoting good gas-solids contact involving regulation of flow of gaseous reactants to the reaction zone in which the aforesaid finely divided solids are present.

It is known that in the operation of a fluidized system, as the gas flow through the grid is gradually increased from a linear velocity of near zero, a point is reached where small bubbles of the feed gas are formed and pass upwardly through the bed of finely divided solids. (Industrial and Engineering Chemistry, vol. 43, pp. 1220–26, "Fluidization Studies of Solid Particles," by C. O. Miller et al.) As the gas velocity is increased, the bubbles become larger and the solids move about more violently.

The gas velocity required to cause the flow of small bubbles is normally referred to as the "minimum fluidization velocity." At such velocity, expansion of the bed is relatively slight and at flow rates below said velocity, contacting of the solids with the gas is essentially the same as in fixed bed operation. I have observed that during the initial start-up of a reactor employing a properly conditioned hydrocarbon synthesis catalyst in the form of a fluidized bed, better conversions are generally realized during the period fluidization is being attained than thereafter. Since it is known that the gas during the beginning of fluidization occurs in the form of small bubbles, this confirms my original premise that good conversions in fluidized systems are accompanied by the presence of the feed gas in the form of small bubbles. This latter condition then must necessarily favor better gas-solids contact.

In accordance with my invention I am able to maintain this condition within the reaction zone by the use of a pulsating bed of catalyst, i. e., a bed which expands and contracts. Under such conditions, the only time that active synthesis occurs is when gas is being passed through the bed. This condition is provided by pulsing or surging the feed to the reactor so that fluidization is initiated. Thereafter, the flow of gas is discontinued and the bed allowed to collapse or contract. It is evident that such action favors intimate mixing of gas with the finely divided solids of the fluidized bed.

In actual operation of the process of my invention, I prefer to employ a two reactor system wherein the gas flows in cycles from one reactor to the other. The flow cycle to a reactor may vary rather widely in duration but in the majority of instances, cycles of from about 2 to 5 seconds to about 1 minute are considered adequate. At the end of a particular cycle, the gas is diverted to the other reactor and the catalyst bed in the reactor just finishing a synthesis or flow cycle is allowed to settle.

The length of a synthesis cycle depends upon a number of factors. For example, with short catalyst beds, the cycle may cover a greater period of time than with a taller bed of catalyst. This is for the reason that with a bed of the latter type, although the gas bubbles are relatively small and well distributed, as they rise initially through the lower portion of the bed, on traveling higher in the bed tend to coalesce forming larger bubbles giving rise to poorer gas-solids contact in the upper regions of the bed. The detrimental effects of this phenomenon, however, are minimized by the process of my invention owing to the fact that when larger bubbles of the type referred to do begin to form in the upper portion of the bed, the flow of gas is discontinued or diverted to a second reactor. This results in the breaking-up of the larger bubbles by the collapsing action of the bed thus tending to effect more efficient contact of the gas with the catalyst even at the end of the synthesis cycle. Heat transfer during an operation of this type is accomplished in the manner characteristic of fluidized bed procedures since the maximum amount of heat is generated while the bed is fluidized and while the maximum gas flow is employed. Further cooling of the bed during the down or non-synthesis cycle is effected by the use of cooling surfaces placed in the reaction zone in accordance with ordinary engineering practice.

Generally speaking, when using beds containing approximately the same quantity of catalyst, the synthesis cycle may be longer in the case of a coarse catalyst, e. g., a catalyst having average particle size of from about −40 to about +325 mesh, than with a more finely divided catalyst. It appears that with the latter type of catalyst, larger bubbles tend to form more readily than in the case of beds composed chiefly of coarser catalyst.

In achieving the desired bed conditions when operating the synthesis process in accordance with my invention, the linear velocity required to obtain the minimum fluidization velocity will depend primarily on the density of the catalyst and its average particle size. Thus, in the case of iron mill scale, the following linear velocity ranges are preferably employed with the indicated ranges of catalyst particle size.

| Particle Size Range | Linear Velocity, Ft. per Second |
| --- | --- |
| −100 mesh | 0.01 to 0.04 |
| −60 to +325 mesh | 0.1 to 0.2 |
| −40 to +325 mesh | 0.15 to 0.25 |
| −40 to +200 mesh | 0.25 to 0.35 |
| −16 to +325 mesh | 0.45 to 0.65 |

For a better understanding of my invention, reference is made to Figure 1 in which synthesis gas containing hydrogen and carbon monoxide in a molecular ratio of about 2:1 is added to the system through line 2 and valved line 4. Synthesis gas is passed into reaction vessel 6 through the cone-shaped bottom thereof and through a perforated grid 8 into the reaction zone 10 where it contacts the catalyst 12 which begins to expand as the gas velocity is slowly increased. Heat generated by the reaction is withdrawn from the system both by contacting of the gas with the fluidized catalyst particles and also by means of circulating a suitable coolant, such as molten diphenyl through cooling jacket 14. Product gas is withdrawn through line 15 and sent to product recovery system 16 via line 17. When the minimum fluidization velocity has been exceeded, as may be evidenced by appreciable expansion of the catalyst bed, valved line 4 is closed and valved line 20 is opened. This now renders possible continuation of the synthesis cycle in reactor 28 while the bed in the reactor 6 is settling out again. The synthesis cycle described above is repeated in reactor 28 and the product gas sent to the aforesaid product recovery system through lines 24 and 15. A part of the residual gas which leaves the product recovery system through line 18 may be withdrawn and vented to the atmosphere or used as fuel elsewhere in the plant. The remainder of this normally gaseous fraction is preferably transferred by line 30 to line 2 where it is mixed with the fresh feed. Product gas from the reactor is removed through line 24, valved line 15 being closed, and sent to product recovery system 16 via line 17.

Figures 2, 3:
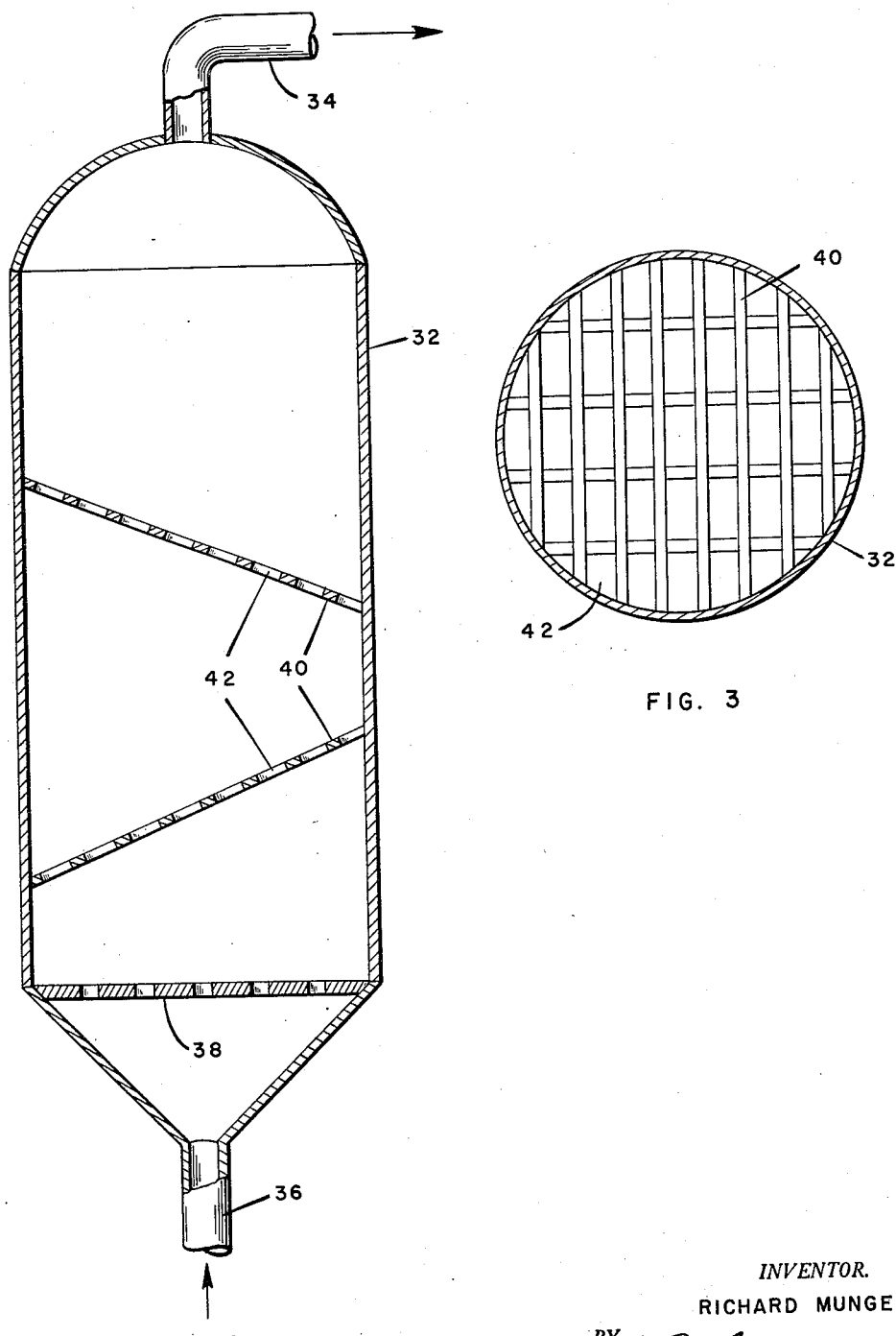

Gas-solids contacting can be improved in the system just described by use of reactors having multiple grids such as is shown in section in Figure 2. This reactor is composed of a cylindrical shell 32 with a hemispheric top and a conically-shaped base having exit and inlet ports 34 and 36, respectively. A horizontal perforated grid 38 is fitted at the base of shell 32, while slanted grids 40 are placed in the reaction zone above the lowermost grid. A grid arrangement of this type tends to break up larger bubbles forming in the reaction zone, thereby improving gas-solids contact in the reactor. Grids 40 have extra large openings 42 so that catalyst may pass freely through the reaction zone. These grids are preferably slanted at an angle slightly greater than the angle of repose of the catalyst thus tending to cause any catalyst which comes to rest on the grid to slide down and fall on through the openings therein. In using reactors of this type in the process of my invention, the feed gas is pulsed to a given reactor forcing catalyst back and forth through the openings in the grids, tending to intimately mix the feed gas with the catalyst particles.

Figure 3 is a plan view of a grid 40 showing the relative size of the holes therein.

Although the above-mentioned methods to be used in improving gas-solids contacting in accordance with my invention are contemplated for use in hydrocarbon synthesis, it will be likewise apparent that the method of my invention may be adapted to any process involving the use of a fluidized solids bed wherein it is desired to improve the gas-solids contacting efficiency. It is to be understood, therefore, that any of such applications of my invention or any embodiments thereof which would be considered obvious to those skilled in the art, are to be interpreted as lying within the scope of my invention.

I claim:

1. In a process for effecting a reaction between gaseous or vaporous reactants which reaction is carried out in the presence of a bed of fluidized finely divided solids which are a catalyst for said reaction in a reaction zone, the improvement which comprises supplying said reactants to said zone, under reaction conditions, upwardly through said finely divided solids at a slowly increasing linear velocity until the minimum fluidization velocity of said solids is reached, thereafter discontinuing the introduction of said reactants to said zone so as to permit said bed to settle in said zone and thereafter repeating the above cycle, said cycle covering a period of from about two seconds to about one minute.

2. In a process for effecting a reaction between gaseous reactants in the presence of a bed of fluidized finely divided catalyst for said reaction, the improvement which comprises alternately supplying said reactants to a first group of reaction zones, under reaction conditions, upwardly through said finely divided catalyst in said first group of reaction zones at a slowly increasing linear velocity until the minimum fluidization velocity of said catalyst in said first group of reaction zones is reached, thereafter discontinuing the introduction of said reactants into said first group of reaction zones so as to permit said finely divided catalyst therein to settle, introducing an additional charge of said reactants into a second group of reaction zones, under reaction conditions, upwardly through said catalyst in said second group of reaction zones at a slowly increasing linear velocity until the minimum fluidization velocity of catalyst is reached, thereafter discontinuing the introduction of said reactants into said second group of reaction zones so as to permit said catalyst therein to settle, and repeating the above cycle, the introduction of reactants into each one of said groups requiring a period of from about two seconds to about one minute.

3. In a process for effecting a reaction between gaseous reactants in the presence of a bed of fluidized finely divided solids which are a catalyst for said reaction, the improvement which comprises alternately supplying said reactants to two separate reaction zones containing said finely divided solids upwardly through said finely divided solids in one of said zones at a slowly increasing linear velocity until the minimum fluidization velocity is reached, thereafter discontinuing the introduction of said reactants into the one of said zones so as to permit said solids to settle therein, thereafter supplying said reactants to the other of said zones under reaction conditions upwardly through said finely divided solids at a slowly increasing linear velocity until the minimum fluidization velocity is reached, thereafter discontinuing the introduction of said reactants into said other of said zones so as to permit said bed to settle therein and thereafter repeating the above cycle, said cycle covering a period of from about two seconds to about one minute.

4. The process of claim 1 in which the finely divided solids employed consist essentially of hydrocarbon synthesis catalyst and the gaseous reactants are carbon monoxide and hydrogen.

5. The process of claim 1 in which the finely divided solids consist essentially of a finely divided iron hydrocarbon synthesis catalyst and the gaseous reactants are carbon monoxide and hydrogen.

6. The process of claim 3 in which the finely divided solids consist essentially of a hydrocarbon synthesis catalyst and the gaseous reactants are carbon monoxide and hydrogen.

7. The process of claim 3 in which the finely divided solids consist essentially of an iron hydrocarbon synthesis catalyst and the gaseous reactants are carbon monoxide and hydrogen.

References Cited in the file of this patent

UNITED STATES PATENTS

| | | |
|---|---|---|
| 1,776,876 | Winkler | Sept. 30, 1930 |
| 1,912,243 | Andrews | May 30, 1933 |
| 2,432,745 | Gary | Dec. 16, 1947 |
| 2,654,661 | Gorin | Oct. 6, 1953 |
| 2,660,598 | Hoffert | Nov. 24, 1953 |
| 2,662,091 | Odell | Dec. 8, 1953 |
| 2,671,103 | Kolbel et al. | Mar. 2, 1954 |

OTHER REFERENCES

Matheson et al.: "Ind. and Eng. Chem." vol. 41, No. 6, June 1949, pages 1099 to 1104.